United States Patent
Rousseau et al.

(10) Patent No.: US 12,449,677 B2
(45) Date of Patent: *Oct. 21, 2025

(54) FRAME FOR A HEAD MOUNTED DEVICE

(71) Applicant: Essilor International, Charenton-le-Pont (FR)

(72) Inventors: Denis Rousseau, Charenton-le-Pont (FR); Marie Lore, Charenton-le-Pont (FR); Guillaume Broutin, Charenton-le-Pont (FR); Jean Sahler, Charenton-le-Pont (FR); Paul Gil, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 17/689,764

(22) Filed: Mar. 8, 2022

(65) Prior Publication Data

US 2022/0244576 A1    Aug. 4, 2022

Related U.S. Application Data

(63) Continuation of application No. 16/308,943, filed as application No. PCT/EP2017/063444 on Jun. 2, 2017, now Pat. No. 11,300,813.

(30) Foreign Application Priority Data

Jun. 13, 2016 (EP) ..................................... 16305710

(51) Int. Cl.
*G02C 1/00* (2006.01)
*G02B 27/01* (2006.01)
(Continued)

(52) U.S. Cl.
CPC .......... *G02C 11/10* (2013.01); *G02B 27/0101* (2013.01); *G02B 27/017* (2013.01);
(Continued)

(58) Field of Classification Search
CPC .......... G02C 11/06; G02C 11/00; G02C 7/02; G02C 7/04; G02C 5/00; G02C 5/143;
(Continued)

(56) References Cited

U.S. PATENT DOCUMENTS 8,979,295 B2 * 3/2015 Waters .................... A42B 1/242
351/158
9,429,772 B1   8/2016 Heinrich et al.
(Continued)

FOREIGN PATENT DOCUMENTS

CA      2 947 809        12/2015
CN      202815358 U      3/2013
(Continued)

OTHER PUBLICATIONS

International Search Report issued on Aug. 28, 2017 in PCT/EP2017/063444 filed on Jun. 2, 2017.
(Continued)

*Primary Examiner* — Dawayne Pinkney
(74) *Attorney, Agent, or Firm* — Oblon, McClelland, Maier &Neustadt, L.L.P.

(57) ABSTRACT

A frame for a head mounted device including: a front part; a first temple configured to be electronically connected to the front part via a first connection and including a battery providing electrical power arranged in a cavity in the first temple and connected electrically to the first connection; a second temple configured to be electrically connected to the front part and having a cavity therein configured to receive therein at least one electronic module; and a second connection configured to connect electrically the battery of the
(Continued)

first temple to the at least one electronic module of the second temple via the front part to receive power therefrom.

20 Claims, 7 Drawing Sheets

(51) Int. Cl.
  *G02C 3/00* (2006.01)
  *G02C 5/00* (2006.01)
  *G02C 5/14* (2006.01)
  *G02C 7/08* (2006.01)
  *G02C 11/00* (2006.01)
  *G02C 13/00* (2006.01)
  *H04R 13/00* (2006.01)

(52) U.S. Cl.
  CPC ............ *G02C 5/008* (2013.01); *G02C 7/083* (2013.01); *G02B 2027/0138* (2013.01); *G02B 2027/0178* (2013.01); *G02C 2200/08* (2013.01)

(58) Field of Classification Search
  CPC .......... G02C 5/006; G02C 11/02; G02C 5/20; G02C 5/16; G02B 27/145; G02B 27/0172; G02B 27/144; G02B 27/0101
  USPC .... 351/158, 159.01, 159.75, 159.76, 159.73, 351/159.74, 178, 41, 111, 116, 121, 52, 351/119, 114, 115; 345/7, 9; 381/381, 381/327, 68.5
  See application file for complete search history.

(56) References Cited

U.S. PATENT DOCUMENTS

| | | | |
|---|---|---|---|
| 2002/0140899 A1 | 10/2002 | Blum | |
| 2007/0121220 A1* | 5/2007 | Tsai | G02B 27/0012 359/754 |
| 2009/0296044 A1 | 12/2009 | Howell et al. | |
| 2009/0326693 A1* | 12/2009 | Yanari | G02C 7/061 351/159.73 |
| 2010/0110368 A1 | 5/2010 | Chaum | |
| 2010/0157242 A1* | 6/2010 | Esser | G02C 7/027 351/159.76 |
| 2010/0177277 A1* | 7/2010 | Kokonaski | H02J 50/10 320/108 |
| 2010/0296055 A1* | 11/2010 | Esser | G02C 7/027 351/204 |
| 2010/0309428 A1* | 12/2010 | Altheimer | G02C 7/061 703/2 |
| 2012/0002159 A1 | 1/2012 | Blum et al. | |
| 2012/0002160 A1 | 1/2012 | Blum et al. | |
| 2012/0081661 A1* | 4/2012 | Yamakaji | G02C 7/061 351/159.01 |
| 2012/0133885 A1 | 5/2012 | Howell et al. | |
| 2013/0215374 A1 | 8/2013 | Blum et al. | |
| 2013/0235331 A1 | 9/2013 | Heinrich et al. | |
| 2013/0250233 A1 | 9/2013 | Blum et al. | |
| 2014/0002799 A1* | 1/2014 | Wildsmith | A61B 3/10 351/200 |
| 2014/0293215 A1 | 10/2014 | Blum et al. | |
| 2015/0042544 A1 | 2/2015 | Sugihara et al. | |
| 2015/0055086 A1* | 2/2015 | Fonte | G06F 16/22 700/98 |
| 2015/0253590 A1 | 9/2015 | Howell et al. | |
| 2015/0378180 A1 | 12/2015 | Blum et al. | |
| 2016/0097930 A1 | 4/2016 | Robbins et al. | |
| 2016/0270656 A1 | 9/2016 | Samec | |
| 2017/0059886 A1 | 3/2017 | Fayolle et al. | |
| 2017/0188807 A1 | 7/2017 | Swital et al. | |

FOREIGN PATENT DOCUMENTS

| | | | | |
|---|---|---|---|---|
| WO | WO-2015014911 A1 * | 2/2015 | ......... | G02B 27/0172 |
| WO | WO 2015/124574 A1 | 8/2015 | | |
| WO | WO 2015/173388 A2 | 11/2015 | | |

OTHER PUBLICATIONS

Office Action issued Apr. 22, 2025 in European Patent Application No. 16305710.2, citing Document 15.

* cited by examiner

FRAME FOR A HEAD MOUNTED DEVICE

CROSS REFERENCE TO RELATED APPLICATIONS

This application is a continuation of U.S. application Ser. No. 16/308,943, filed on Dec. 11, 2018 (the entire contents of which are incorporated herein by reference), and is based upon and claims the benefit of priority to International Application No. PCT/EP2017/063444, filed on Jun. 2, 2017 and EP 16305710.2, filed on Jun. 13, 2016.

FIELD OF THE INVENTION

The invention relates to a frame for a head mounted device comprising electronic modular elements mounted and to a head mounted device comprising such frame.

BACKGROUND OF THE INVENTION

Electronic spectacle frames have an important and rapid growth. More and more electronic spectacle frames are being develop with a greater variety of different electronic elements.

Electronic spectacle frame may comprise many different electronic elements such as sensors, displays, active lenses, batteries, processors for local processing and communication devices, and charging devices.

With the growing interest in electronic spectacle frames, it has become important to provide a solution that allows for adjusting the combination of different electronic elements.

Each combination requires designing a specific spectacle frame including the required electronic elements, without the possibility to easily modify the spectacle frame design when a modification is to be made, like adding a sensor or modifying the battery type.

Therefore, there is a need for a solution allowing to provide a spectacle frame or a frame for a head mounted device that would allow customizing the combination of electronic components with modularity and without having to change the spectacle frame.

An aim of the present invention is to propose such solution.

SUMMARY OF THE INVENTION

To this end, the invention proposes a frame for a head mounted device comprising:
 a front part,
 a first temple configured to be electronically connected to said front part via a first connection means and comprising battery means for providing electrical power arranged in a cavity in the first temple and connected electrically to the first connection means,
 a second temple configured to be electronically connected to said front part and having a cavity therein configured to receive therein at least one electronic module, and
a second connection means configured to connect electrically the battery means of the first temple to the at least one electronic module of the second temple via the front part to receive power therefrom.

Advantageously, the frame according to the invention has a modular design, in that different parts can be easily electronically connected together, each part can have different functions, and be changed or upgraded without having to redesign the other parts of the frame.

Such arrangement of the frame allows developing different electronic spectacle frame with similar design, and re-use some modules for different applications, that can be a combination of the different modules available or to be developed.

According to further embodiments which can be considered alone or in combination:
 one of the front part or the first temple comprises at least a complementary electronic module configured to be electrically connected to the battery means; and/or
 one of the first temple or the second temple comprises a body and a tip configured to be attached to the body of the temple and having a cavity therein configured to removably receive therein at least an additional electronic module, the temple comprises an additional connection means connector configured to attach the tip to the body of the temple and to connect electrically the battery means of the first temple to the additional electronic module of the tip to receive power therefrom; and/or
 the tip is removably attached to the temple; and/or
 at least one of the connection means comprises a data bus configured to transfer data between at least two electronic modules; and/or
 at least one of the front part, the first temple or the second temple comprises a processor configured to control at least an electronic module of the front part and/or the first temple and/or the second temple; and/or
 the front part comprises a complementary module and a lens frame configured to receive an active lens and to position said active lens in front of an eye of a user of the head mounted device when the user worn the head mounted device, the complementary module comprises an optical function controller configured to control the optical function of the active lens; and/or
 the at least one electronic module and/or the at least one supplementary electronic module and/or the complementary electronic module and/or the additional electronic module comprises:
  at least a sensor configured to sense at least one data relating to a user of the head mounted device when the user worn the head mounted device;
  a communication unit associated with the at least one sensor and configured to communicate said data to a unit and/or another electronic module of the frame; and/or
 the sensor is adapted to measure at least one user environment parameter and/or at least one user physiological parameter and/or at least one user visual behavior parameter; and/or
 one electronic module comprises an information data generating unit configured to provide a recommendation data based at least on data measured by the sensor and wherein the recommendation data includes an activation of at least another electronic module of the frame; and/or
 the other electronic module of the frame configured to be activated by the recommendation data comprises a vibrator module configured to emit a mechanical vibration when the vibrator module is activated; and/or
 the at least one electronic module and/or the at least one supplementary electronic module and/or the complementary electronic module and/or the additional electronic module comprises a data storage for storing data received from at least one sensor and/or received from a distant unit; and/or the front part comprises a lens frame configured to receive a lens and to position said lens in front of a user of the head mounted device when the user worn the head mounted device, the complementary module comprises at least a display device designed and arranged to display a virtual picture towards the eye of the user; and/or the complementary module comprises at least a camera adapted to acquire images of the environment of the user and the display device is adapted to display to the user virtual images in addition to the real scene seen through the lens, the virtual images depending on the images acquired by the camera and optionally the data received by the sensor modules and/or communication modules.

The invention further relates to a head mounted device comprising a frame according to the invention.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

Figure 1:
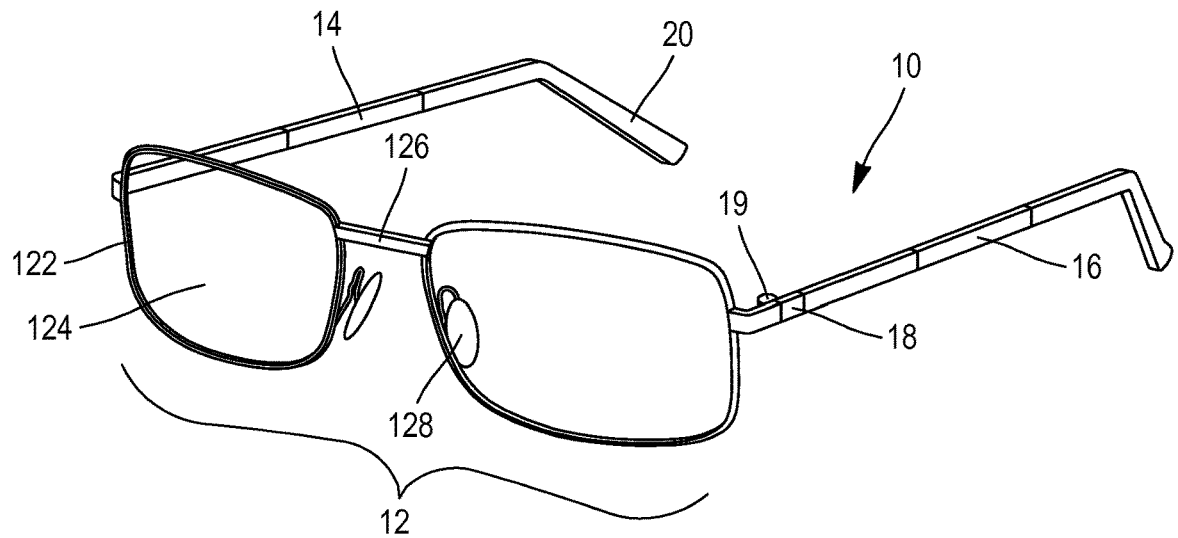
FIG. 1 is a schematic representation of spectacle frame according to the invention.

FIG. 1 represents an example of a frame 10 according to the invention. The frame 10 comprises a front part 12, a first temple 14 and a second temple 16.

The first and second temples 14 and 16 are configured to be attached to the front part 12, for example using hinges 18 and screws 19.

As represented on FIG. 1, the front part 12 may comprise frame rims 122 arranged to receive optical lenses 124, for example ophthalmic lenses. The frame rims are linked by a bridge 126 and may comprise nose pad 128 arranged to rest on the nose of the user when the frame in worn.

The first and second temples may comprise tips 20 arranged to fit around the ears of a user when the frame is being worn by said user.

Figure 2:
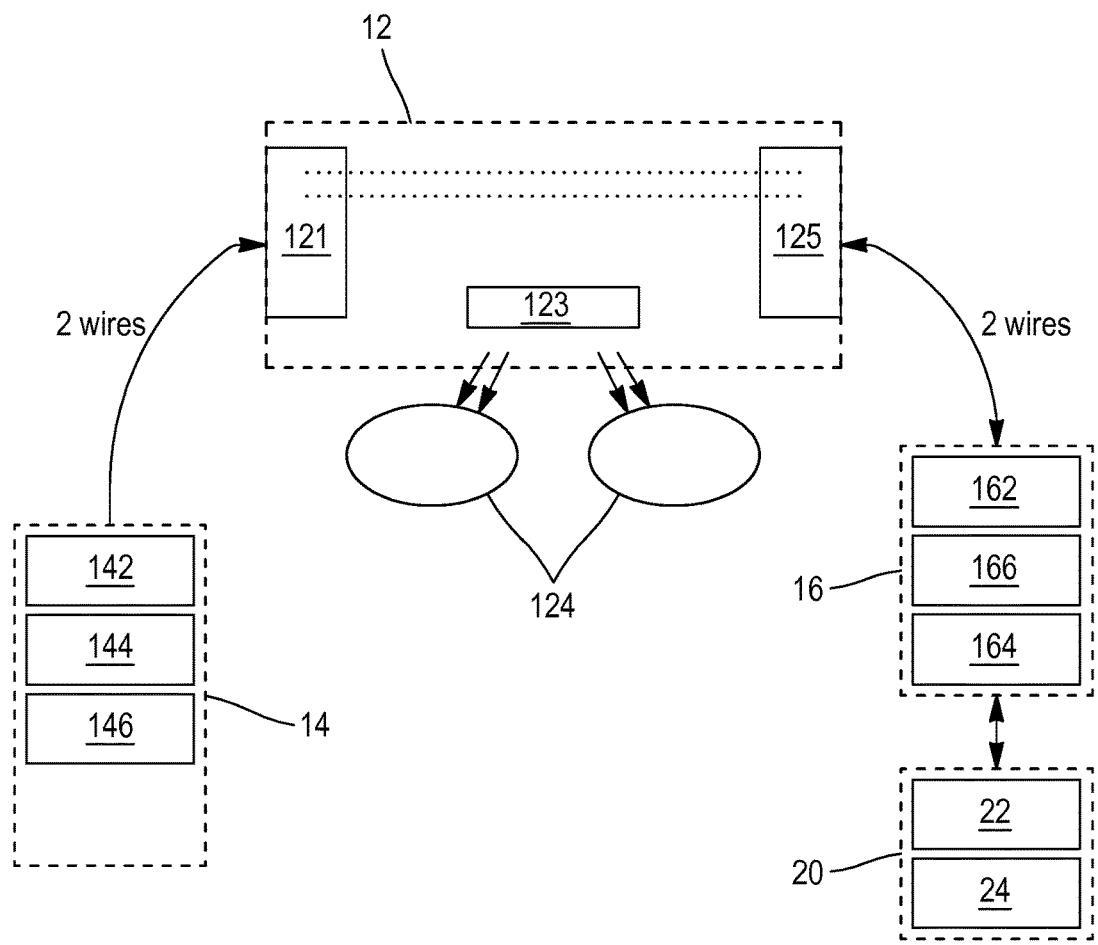
FIG. 2 is an illustration of a frame according to the invention.

FIG. 2, is a schematic representation of an example of architecture of a frame according to the invention.

The first and second temples 14 and 16 are configured to be electronically connected to the front part 12 via a first and second connection means respectively.

The first temple 14 comprises a first connection means 142 configured to be connected, for example by two wires to a first front connection means 121 of the front part 12. The first temple 14 further comprises a battery 144 or power source for providing electrical power.

The battery 144 is typically arranged in a cavity of the first temple. The first temple may further comprise a battery controller. Preferably the battery is as big as possible to offer a great autonomy of the frame.

A battery protection circuit 146 may be included in the first temple 14, preferably as close as possible to the battery 144.

The second temple 16 comprises second connection means 162 configured to be connected, for example by two wires to a second front connection means 125 of the front part 12.

The second temple 16 further comprises a cavity configured to receive at least an electronic module 166, for example in a removable manner. The electronic module 166 is configured to be connected to the battery of the first temple 14 so as to receive power form said battery 144.

The second connection means 162 is configured to connect electrically the battery comprised in the first temple to the at least one electronic module of the second temple via the front part to receive power therefrom.

As described previously, the front part 12 comprises a first front connection means 121 configured to be connected, for example by two wires, to the first connection means 142 of the first temple 14, and a second front connection means 125 configured to be connected, for example by two wires, to the second connection means 162 of the second temple 16.

As illustrated on FIG. 2, the front part may comprise at least a complementary electronic module 123 configured to be electrically connected to the battery of the first temple. Although not illustrated on FIG. 2, the first temple may comprise a complementary electronic module configured to be electrically connected to the battery.

As illustrated on FIGS. 1 and 2, the first and/or second temple may further comprise a body and a tip 20. The tip being configured to be received on the ears of the user.

The tips 20 are attached to the body of the temples and at least one of the tips may have a cavity configured to receive, for example removably, at least an additional electronic module 24.

At least one of the temples may comprise an additional electronic connector 164 configured to connect the tip 20 to the body of the temple 16 and to connect electrically the battery of the first temple to the additional electronic module of the tip to receive power therefrom. Therefore, the additional electronic module 24 may be supplied with power.

According to an embodiment of the invention, the tip 20 may be removably attached to the temple. Therefore, allowing to change the additional electronic module very easily without having to change any other element of the frame.

The frame may comprise, in one of the first and second temple or front part, a processor configured to control at least an electronic module of the front part and/or the first temple and/or the second temple.

According to an embodiment, at least one of the electronic module, the supplementary electronic module, the complementary electronic module and the additional electronic module may comprise a sensor configured to sense at least one data relating to a user of the frame when the user is using the frame.

The frame may further comprise a communication unit associated with the sensor and configured to communicate said data to a unit and/or another electronic module of the frame and/or a distant unit.

The sensor may be adapted to measure, for example sense, at least one environment parameter and/or at least one user physiological parameter and/or at least one user visual behavior parameter.

The environment parameter may relate to the light composition and/or exposure and/or spectral composition of natural light and/or the time exposure to artificial light and/or the time spend using a display, such as a smartphone, TV screen, computer screen, and/or the air composition, for example the quantity of specific chemical compounds.

Typically, the physiological parameter may relate to the features of the eyes of the user for example eye color and/or pupil diameter.

The visual behavior may provide indication relating to the gazing behavior of the user, such as gazing direction, gazing distances, variation of gazing distances.

The visual behavior may further relate to oculomotor parameters of the user, such as eye movements, saccades, accommodation, and/or convergence.

The visual behavior may further relate to ocular parameters of the user, such as opening of the eyelid, pupil diameter, blink frequency, duration of the blink, and strength of the blink.

The visual behavior may further relate to the accommodation fluctuation of the user and/or the relative movement of the head and the eyes of the user.

At least one of the electronic module may comprise an information data generating unit configured to provide, for example generate, vision information, for example a recommendation, based at least on data measured by the sensor of the frame.

The vision information may relate to a recommendation for the user of the frame.

For example, the recommendation may be a lens design recommendation and/or an ophthalmic means recommendation and/or an adaptation of the visual behavior. The ophthalmic means may include contact lenses and/or ophthalmic lenses and/or a spectacle frame comprising a pair of ophthalmic lenses and/or refractive surgery.

The recommendation may be for the user to have his vision checked, for example based on the monitoring of the behavior it is possible to identify that the user would need to change their ophthalmic prescription.

Such recommendation may be provided directly to the user or sent to an eye care professional that may use the provided recommendation to adjust the recommendation to each wearer individually.

The vision information may be an alert for the user.

For example, the vision information may be an alert indicative of the vision state and/or fatigue state and/or non-recommended vision behavior of the user.

Such alert may be provided directly to the user or sent to an eye care professional that may decide to carry out further vision exam based on such alert.

The vision information may be an activation of at least one functionality on a head mounted device comprising the frame of the invention.

The vision information may be an access to a service offer. For example, providing access and/or suggesting access to a specific service that may be useful for the user.

For example, the frame may comprise a vibrator module configured to emit a mechanical vibration when activated. The vision information may activate such vibrator module.

The frame according to the invention may comprise a data storage for storing data received from at least one sensor and/or received from a distant unit. In particular, one or more of: the electronic module, the supplementary electronic module, the complementary electronic module and the additional electronic module may comprise a data storage.

According to an embodiment of the invention, the front part comprises a complementary module and a lens frame configured to receive an active lens and to position said active lens in front of an eye of a user when the user worn the frame.

The complementary module may comprise an optical function controller configured to control the optical function of the active lens.

The vision information generated by the information data generating unit may activate a filtering functionality and/or adjust the optical function of the active lens.

The optical function may comprise dioptric function, light transmission, light reflection absorption, polarizing capability, reinforcement of contrast capacity, etc. . . . .

The dioptric function corresponds to the optical lens power (mean power, astigmatism etc. . . . ) as a function of the gaze direction.

The optical function of the head mounted device may comprise the dioptric function of at least one of the lenses that the head mounted device may comprise, a sun protection function for example by controlling a transmission parameter of the head mounted device or the polarization of a surface of at least one of the lenses that the head mounted device may comprise.

For example, the dioptric function may be adapted by adapting the addition in the near zone to relieve the user from the visual fatigue. The color or light absorption of the optical lenses may also be adapted.

Figure 3:
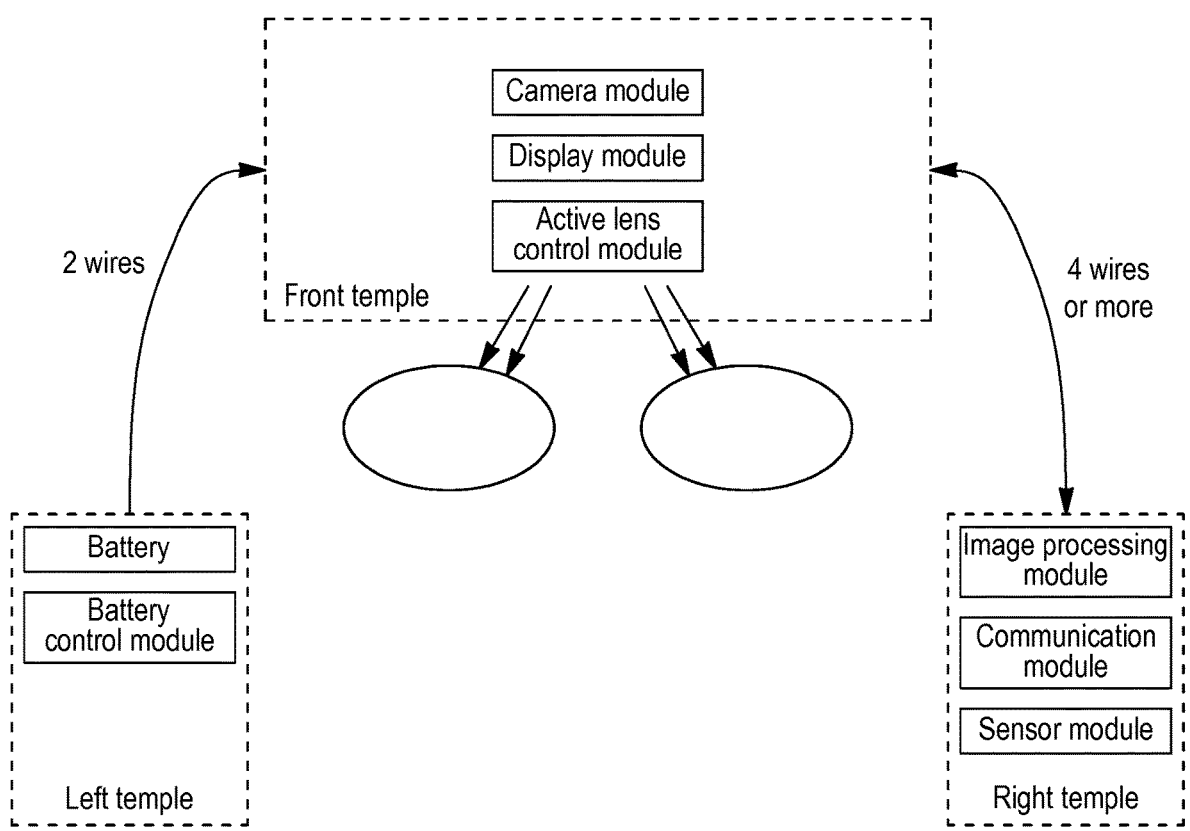
FIGS. 3, 4, 5, 6, 7 and 8 are illustration of different embodiments of the invention.

As illustrated on FIG. 3, the complementary module in the front part may further comprise a display device designed and arranged to display a virtual picture, for example an image, towards the eye of the user.

For example, the complementary module may comprise a camera adapted to acquire images of the environment of the user and the display device is adapted to display to the user images in addition to the real scene seen through the lens, the images depending on the images acquired by the camera.

The wires that connect the different elements can be flexible wires or wires directly printed on the frame material, with electronic printing technologies provided by companies like LPKF or NEOTECH.

The frame may comprise two wires that are power supply wires.

The connection means may comprise a data bus configured to transfer data between the different electronic modules of the frame.

This data bus can be a 2 wire bus like I$^2$C, but also more complex bus like USB bus, CAN bus, Ethernet bus, SPI, DSI or any other low pin count bus to transfer data from the temples to the front part.

The different elements can be printed circuit boards, on rigid or flex boards, or components directly inserted or glued or printed on the frame material. Depending of the application, some modules can be easily removable or fixed in the frame.

The wires that connect the front part to the temples can be common communication wires, with a standard communication protocol like serial communication, or a more complex protocol, like USB, MIPI or Ethernet protocol.

The connectors can be specific connectors with reduced size and improved reliability, like IP65 waterproof norm, or standard micro USB connectors, that allow battery charging and high speed communication with other modules or external devices.

Figure 4:
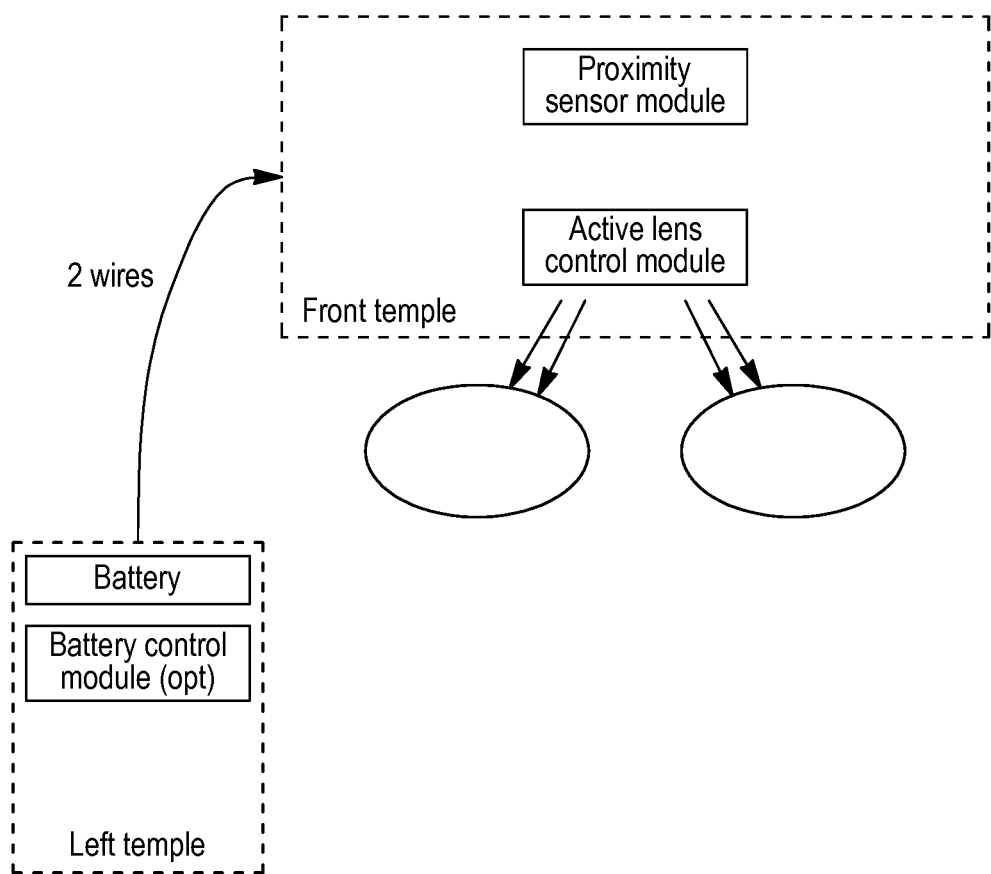

FIG. 4 illustrates an arrangement of a frame according the invention adapted for presbyotic lenses. The front part comprises a proximity sensor arranged to determine the distance between an object and the eyes of the user. The front part further comprises active lenses controlled to increase dioptric effect for the user.

Figure 5:
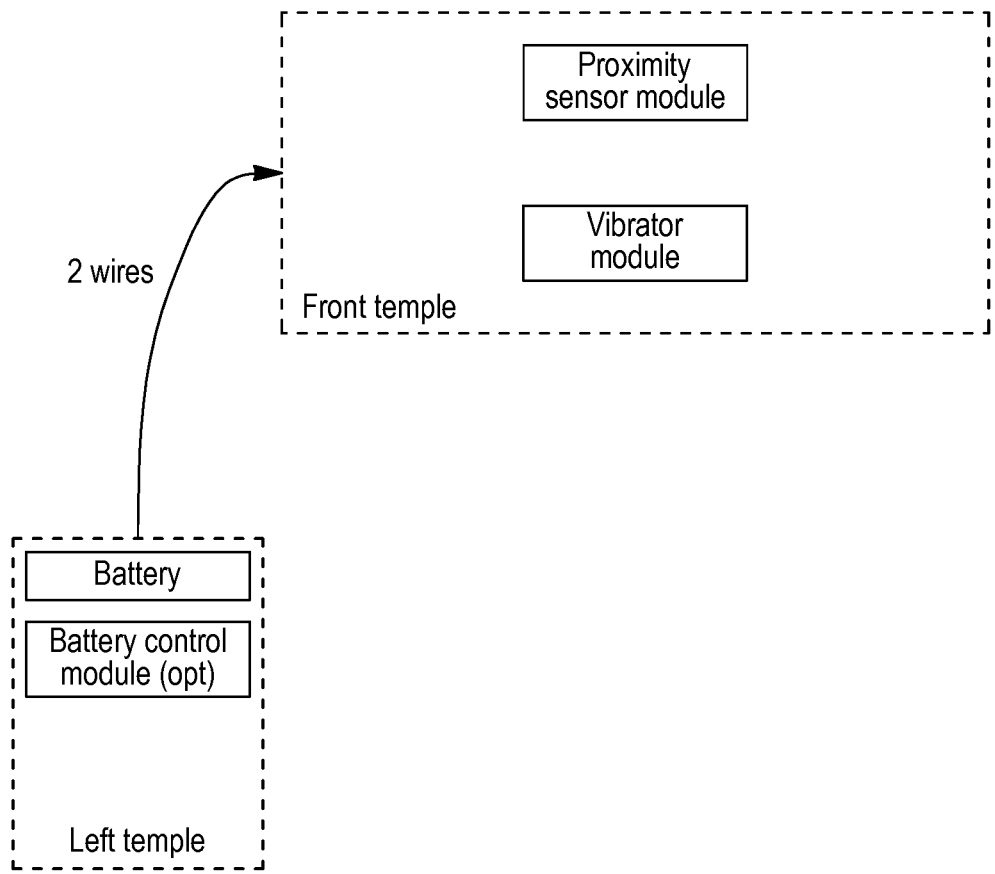

FIG. 5, illustrates an arrangement of a frame according to the invention adapted for a child so as to prevent myopia.

The front part comprises a proximity sensor arranged to determine the distance between an object and the eyes of the user. The front part further comprises a vibrator module. The vibrator module may be used to warn the user when he is reading at a too close distance.

Figure 6:
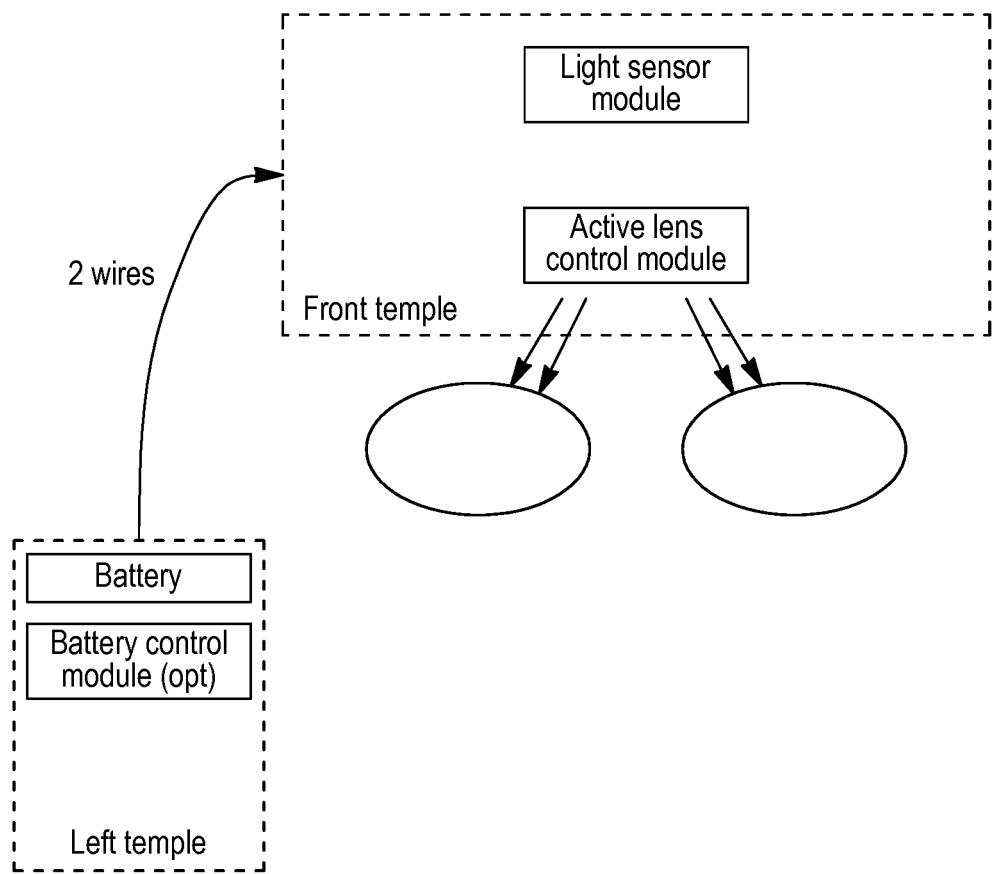

FIG. 6, illustrates an arrangement of a frame according to the invention adapted for providing active sunglasses. The front part comprises a light sensor arranged to determine the luminosity of the environment. The front part further comprises active lenses, such as LCD lenses or electrochromic lenses whose opacity may be controlled based on the luminosity of the environment.

Figure 7:
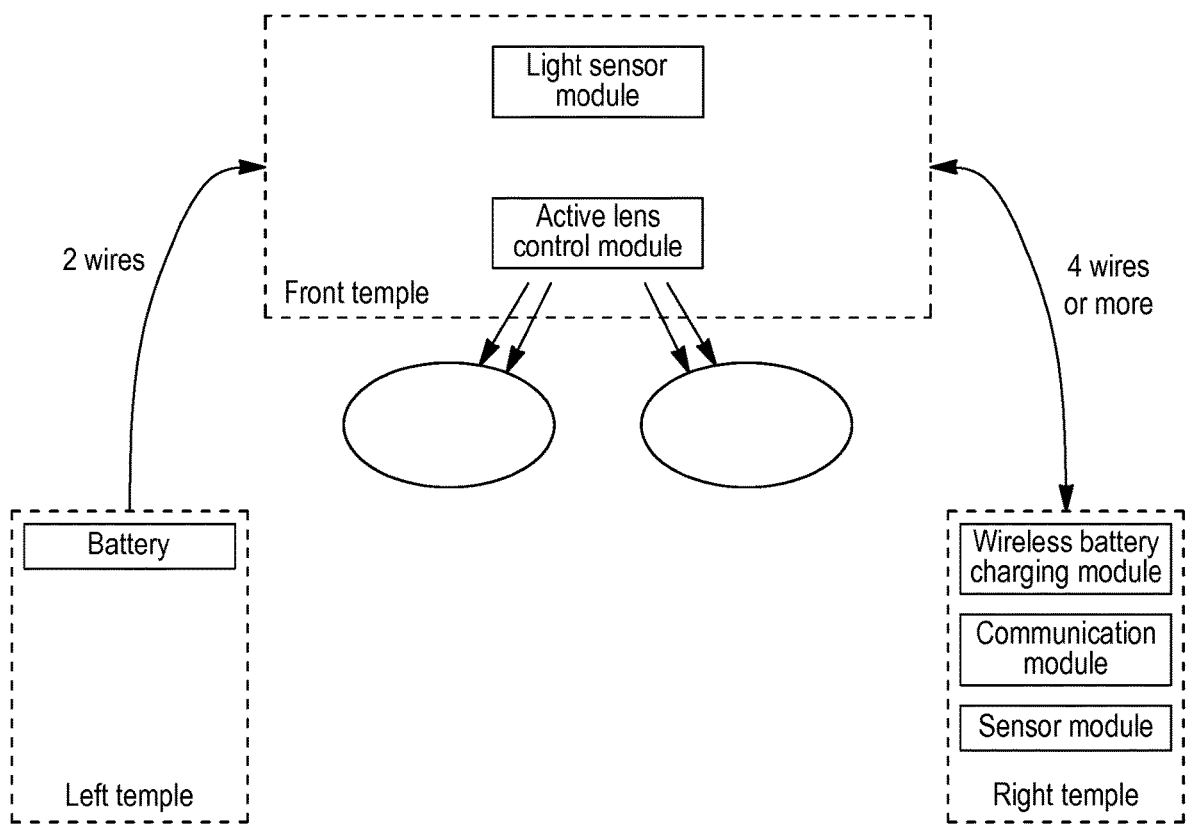

FIG. 7, illustrates an arrangement of a frame according to the invention as illustrated on FIG. 6, with in addition a wireless battery charging module in the second temple. An example of such wireless battery charging module is disclosed in EP15305767.

Figure 8:
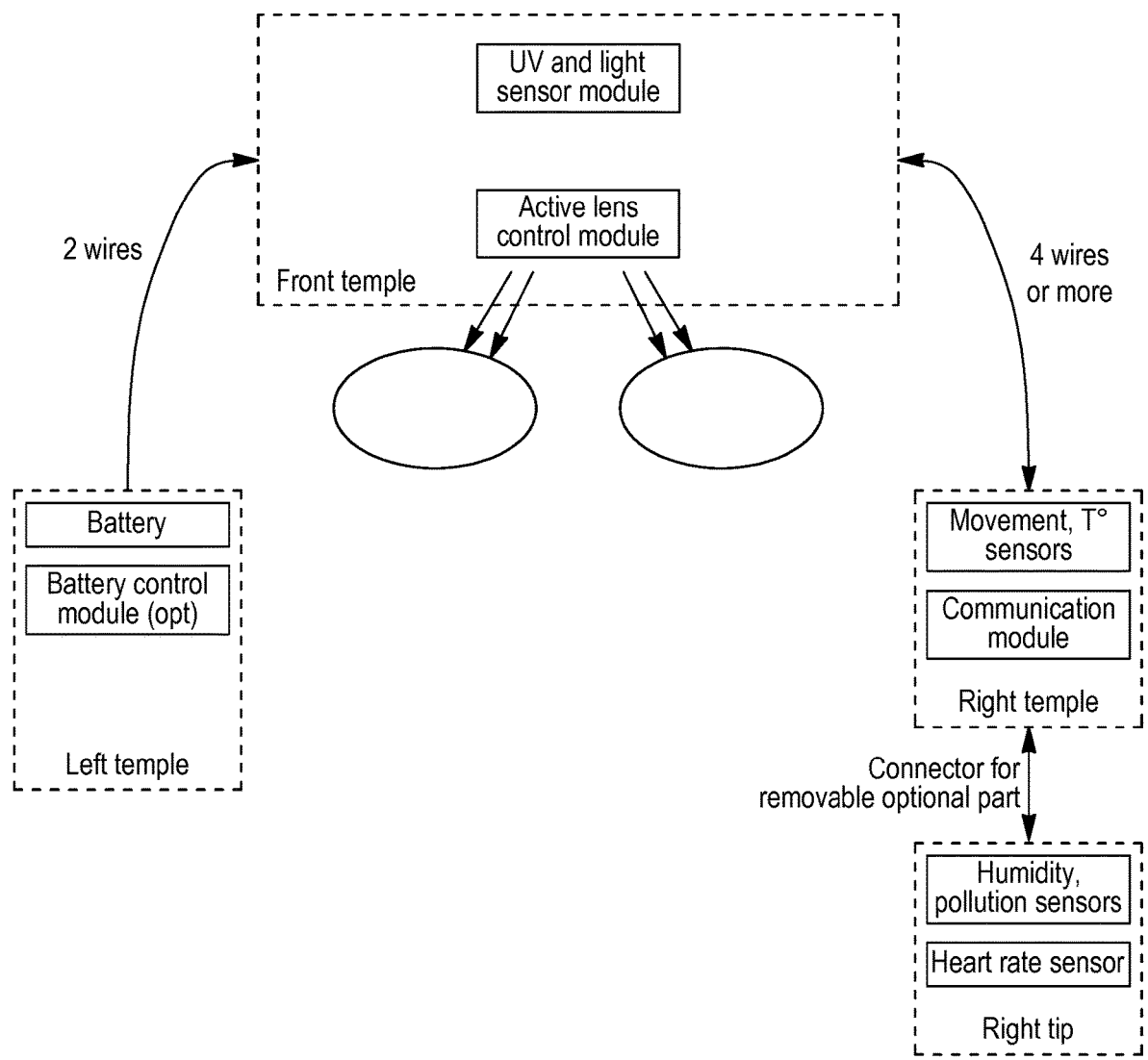

FIG. 8, illustrates an arrangement of a frame according to the invention as illustrated on FIG. 6, with added functionalities for health monitoring.

In the right temple are some supplementary sensors and communication module, and also a removable tip that can contain supplementary sensors that can be used if necessary, and that can be not waterproof, in case if the glasses are waterproof. The advantage is that the same system can be used with different right tips containing different sensors, that can fit for some specific activities; like running, biking, car driving, and so on.

All of these examples may comprise more or less sensors or communication modules than described. Additionally, one or more batteries can be added on the frame to increase battery life. The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A frame for a head mounted device comprising:
   a front part;
   a first temple configured to be electronically connected to the front part via a first connection means and comprising battery means for providing electrical power arranged in a cavity in the first temple and connected electrically to the first connection means;
   a second temple configured to be electrically connected to the front part and including a cavity therein configured to receive therein at least one electronic module;
   second connection means configured to connect electrically the battery means of the first temple to the at least one electronic module of the second temple via the front part to receive power therefrom; and
   a wireless battery charging module arranged in at least one of the first temple or the second temple and configured to charge the battery means wirelessly, the wireless battery charging module being configured to connect to a data bus of the frame and to be controlled by a processor of the frame, wherein
   at least one of the electronic module, a supplementary electronic module, a complementary electronic module, and an additional electronic module comprises a sensor configured to sense at least one data relating to a user of the frame when the user is using the frame, the at least one data relating at least to one user physiological parameter,
   at least one electronic module comprises an information data generating unit configured to provide a recommendation data based on at least one data measured by the sensor of the frame,
   the recommendation data is a lens design recommendation, the recommendation data including an activation of at least another electronic module of the frame, and
   the front part comprises the complementary electronic module and a lens frame configured to receive an active lens and to position the active lens in front of an eye of a user of the head mounted device when the user wears the head mounted device, the complementary electronic module comprises an optical function controller configured to control an optical function of the active lens.

2. The frame according to claim 1, wherein the complementary electronic module is configured to be electrically connected to the battery means.

3. The frame according to claim 1, wherein one of the first temple or the second temple comprises a body and a tip configured to be attached to the body of the temple and including a cavity therein configured to removably receive therein the additional electronic module, the temple comprises third connection means configured to attach the tip to the body of the temple and to connect electrically the battery means of the first temple to the additional electronic module of the tip to receive power therefrom.

4. The frame according to claim 3, wherein the tip is removably attached to the temple.

5. The frame according to claim 1, wherein at least one of the connection means comprises a data bus configured to transfer data between at least two electronic modules.

6. The frame according to claim 1, wherein at least one of the front part, the first temple, or the second temple comprises a processor configured to control at least an electronic module of the front part and/or the first temple and/or the second temple.

7. The frame according to claim 2, wherein the at least one electronic module and/or the supplementary electronic module and/or the complementary electronic module and/or the additional electronic module comprises a data storage for storing data received from at least one sensor and/or received from a distant unit.

8. The frame according to claim 3,
   wherein the front part comprises a lens frame configured to receive a lens and to position the lens in front of a user of the head mounted device when the user wears the head mounted device, the complementary electronic module comprises at least a display device configured to display a virtual image towards an eye of the user.

9. The frame according to claim 8, wherein the at least one complementary electronic module comprises at least a camera configured to acquire images of an environment of the user and the display device is configured to display to the virtual image in addition to a real scene seen through the lens, the virtual image depending on the images acquired by the camera.

10. The head mounted device comprising the frame according to claim 1.

11. The frame according to claim 1, wherein the front part comprises active lenses being electrochromic lenses whose opacity is controlled based on luminosity of an environment.

12. The frame according to claim 1, wherein the electronic module and/or the supplementary electronic module and/or the complementary electronic module and/or the additional electronic module comprises a communication unit associated with the at least one sensor and configured to communicate the data to a unit and/or another electronic module of the frame.

13. The frame according to claim 12, wherein the another electronic module of the frame configured to be activated by the recommendation data comprises a vibrator module configured to emit a mechanical vibration when the vibrator module is activated.

14. The frame according to claim 12, wherein the sensor is configured to measure at least one user environment parameter and/or at least one user physiological parameter and/or at least one user visual behavior parameter.

15. The frame according to claim 14, wherein the environment parameter is light composition.

16. The frame according to claim 14, wherein the environment parameter is spectral composition of natural light.

17. The frame according to claim 14, wherein the environment parameter is time of exposure to artificial light.

18. The frame according to claim 14, wherein the environment parameter is time spent using a display.

19. A frame for a head mounted device comprising:
   a first temple configured to be electronically connected to a front part of the frame via a first connector and comprising a power source configured to provide electrical power arranged in a cavity in the first temple and connected electrically to the first connector;
   a second temple configured to be electronically connected to the front part and including a second connector and a cavity configured to receive therein an electronic device; and
   a wireless charger arranged in at least one of the first temple or the second temple and configured to charge the power source wirelessly, the wireless charger being configured to connect to a data bus of the frame and to be controlled by a processor of the frame, wherein
   the second connector is configured to connect electrically the power source of the first temple to the electronic device of the second temple via the front part to receive power therefrom,
   at least one of the electronic device and another electronic device comprises a sensor configured to sense at least one data relating to a user of the frame when the user is using the frame, the at least one data relating at least to one user physiological parameter,
   at least one of the electronic device and another electronic device comprises circuitry configured to provide a recommendation data based on at least one data measured by the sensor of the frame,
   the recommendation data is a lens design recommendation, the recommendation data including an activation of at least another electronic device of the frame, and
   the front part comprises the another electronic device and a lens frame configured to receive an active lens and to position the active lens in front of an eye of a user of the head mounted device when the user wears the head mounted device, the another electronic device comprises an optical function controller configured to control an optical function of the active lens.

20. A frame for a head mounted device comprising:
   a front part;
   a first temple configured to be electronically connected to the front part via a first connection means and comprising battery means for providing electrical power arranged in a cavity in the first temple and connected electrically to the first connection means;
   a second temple configured to be electronically connected to the front part and including a cavity therein configured to receive therein at least one electronic module;
   second connection means configured to connect electrically the battery means of the first temple to the at least one electronic module of the second temple via the front part to receive power therefrom; and
   a wireless battery charging module arranged in at least one of the first temple or the second temple and configured to charge the battery means wirelessly, the wireless battery charging module being configured to connect to a data bus of the frame and to be controlled by a processor of the frame, wherein
   at least one of the electronic module, a supplementary electronic module, a complementary electronic module, and an additional electronic module comprises a sensor configured to sense at least one data relating to a user of the frame when the user is using the frame, the at least one data relating at least to one user physiological parameter,
   at least one electronic module comprises an information data generating unit configured to provide a recommendation data based on at least one data measured by the sensor of the frame,
   the recommendation data is a lens design recommendation, the recommendation data including an activation of at least another electronic module of the frame, and
   the front part comprises a lens frame configured to receive a lens and to position the lens in front of a user of the head mounted device when the user wears the head mounted device, the complementary electronic module comprises at least a display device configured to display a virtual image towards an eye of the user.

* * * * *